Oct. 25, 1966  B. C. PHILLIPS  3,281,128
CHARGE FORMING APPARATUS
Filed Aug. 2, 1963  3 Sheets-Sheet 1
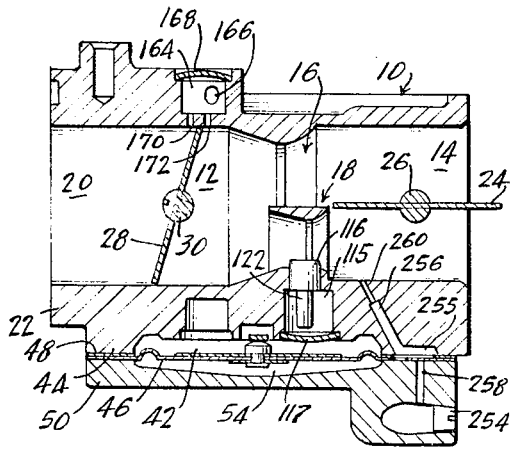
FIG-4-
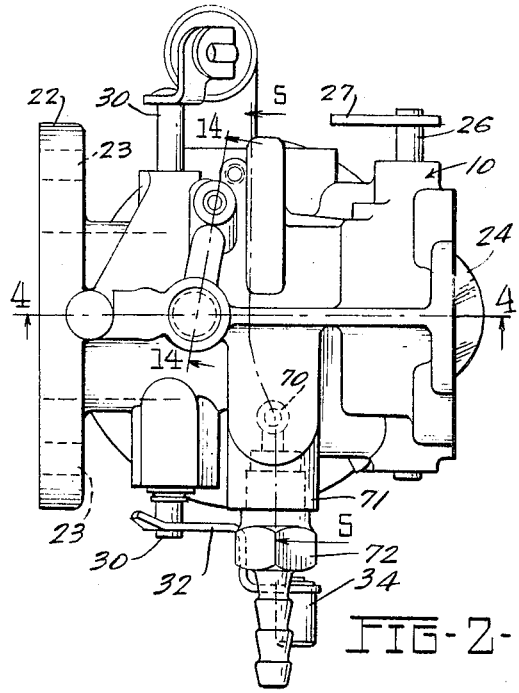
FIG-2-
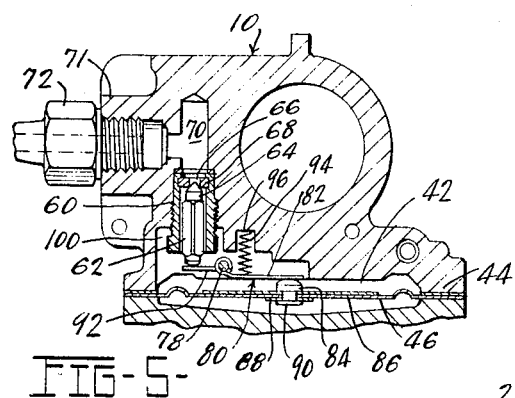
FIG-5-
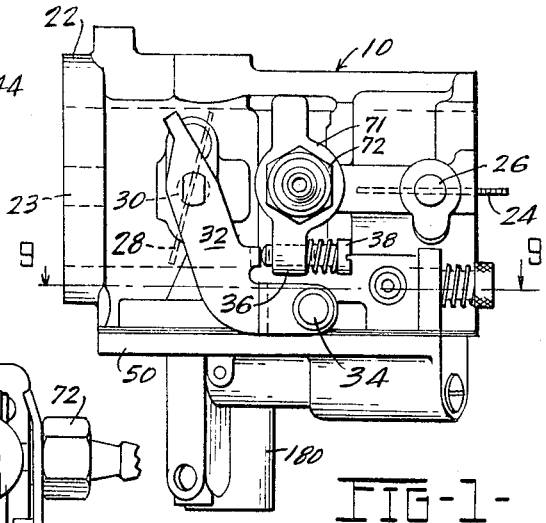
FIG-1-
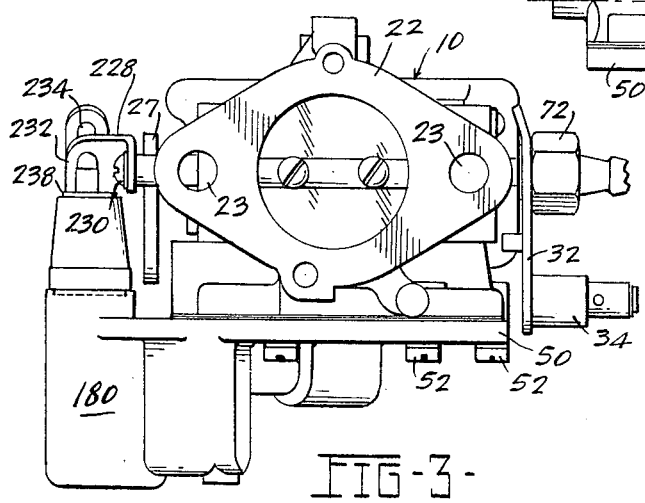
FIG-3-
INVENTOR:
BERNARD C. PHILLIPS.
BY
Harry O. Ernsberger
ATT'Y.

Oct. 25, 1966
B. C. PHILLIPS
3,281,128
CHARGE FORMING APPARATUS
Filed Aug. 2, 1963
3 Sheets-Sheet 2
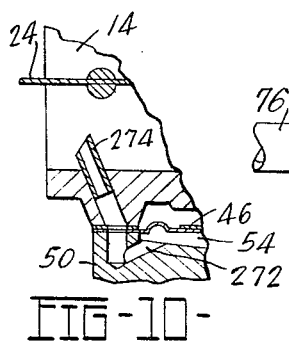
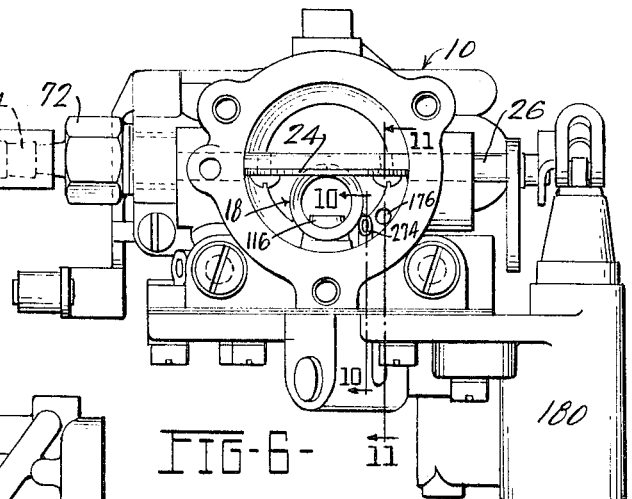
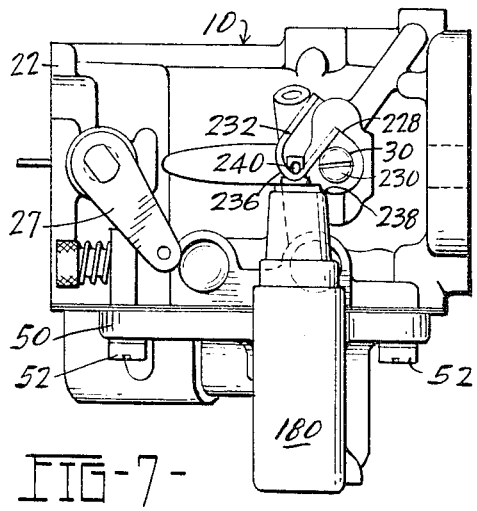
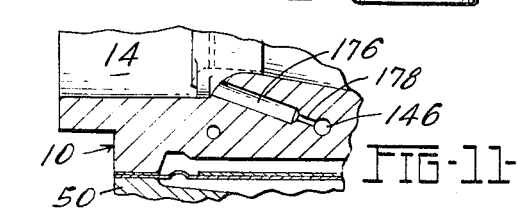
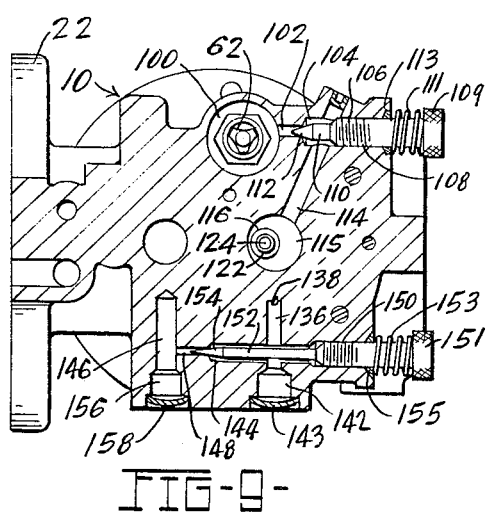
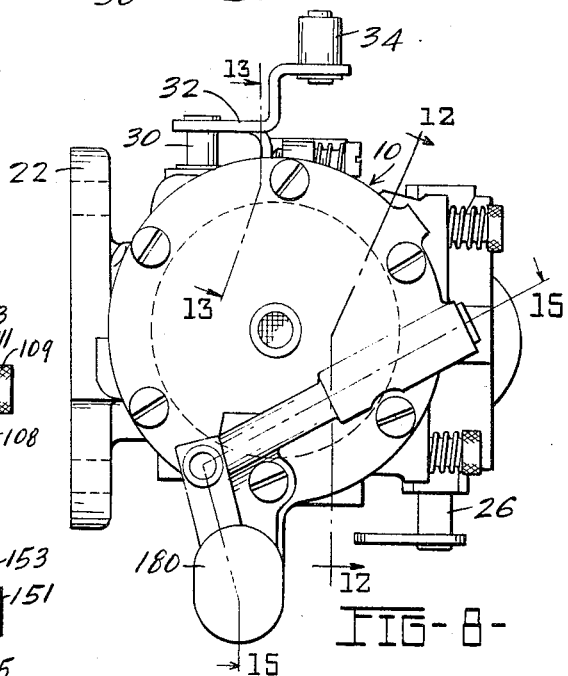
INVENTOR:
BERNARD C. PHILLIPS.
BY
Harry O. Ernsberger
ATT'Y.

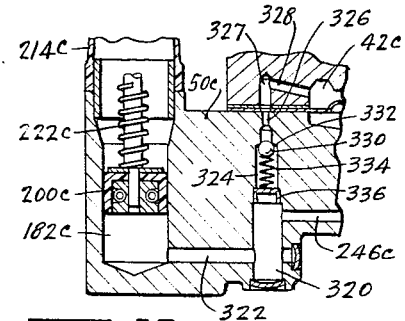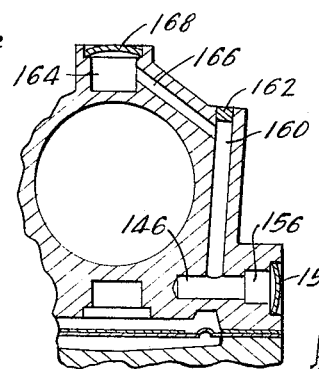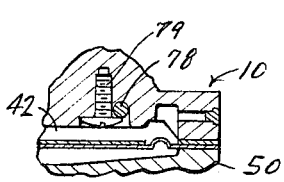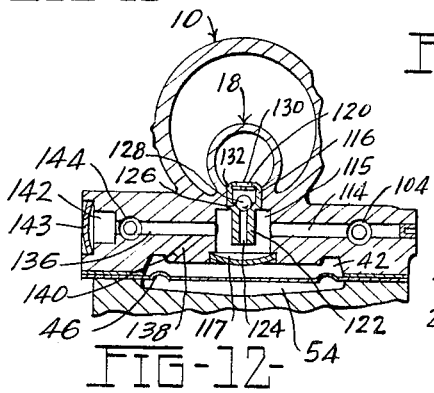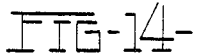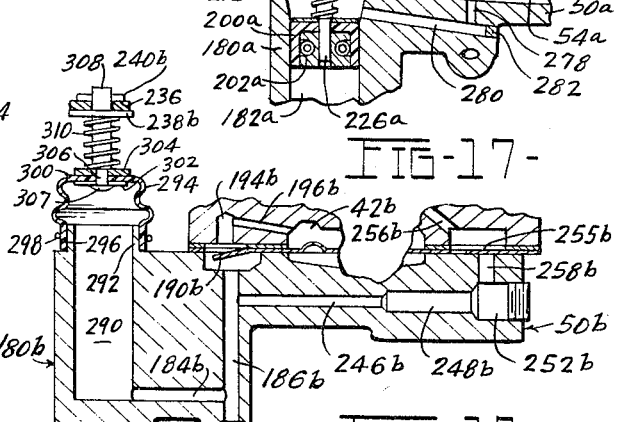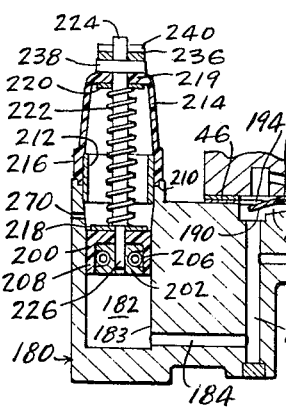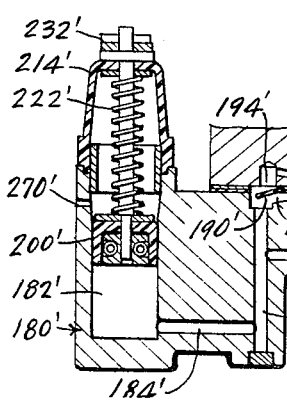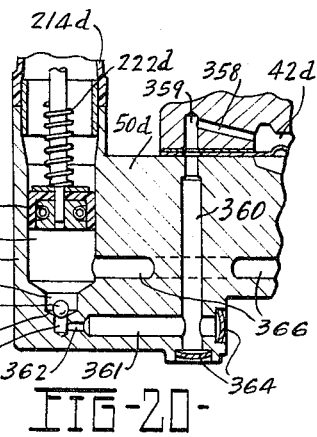

United States Patent Office 3,281,128
Patented Oct. 25, 1966

3,281,128
CHARGE FORMING APPARATUS
Bernard C. Phillips, Toledo, Ohio, assignor to The Tillotson Manufacturing Company, Toledo, Ohio, a corporation of Ohio
Filed Aug. 2, 1963, Ser. No. 299,647
4 Claims. (Cl. 261—34)

This invention relates to an apparatus for forming combustible fuel and air mixture for an internal combustion engine and more especially to a charge forming apparatus embodying a diaphragm-controlled fuel inlet valve means wherein the diaphragm is actuated by aspiration or differential pressure in the mixing passage in association with an arrangement for delivering an increased amount of fuel into the mixing passage for engine accelerating purposes to temporarily enrich the normal fuel and air mixture upon sudden opening movement of the throttle to promote a rapid increase in the speed of the engine.

Charge forming devices embodying diaphragm-controlled inlet valve means for regulating fuel flow from a supply into a fuel chamber in the carburetor or charge forming device for delivery into the mixing passage have been used extensively, particularly with two cycle engines adapted for operation in various positions of tilt.

Diaphragm carburetors of this type have not come into use extensively for use with so-called four cycle or Otto cycle engines as it is usually desirable for successful engine operation to provide for temporary delivery of additional fuel into the mixing passage for engine accelerating purposes.

One arrangement and method for temporarily enriching the mixture in the mixing passage for engine accelerating purposes is disclosed in my Patent 3,037,751 granted June 5, 1962. In the method and arrangement disclosed in this patent, a fluid pressure impulse is imparted to the diaphragm controlling the fuel inlet valve means through the use of a second diaphragm adapted to be influenced by a sudden opening of the throttle valve for transmitting a fluid impulse to the fuel inlet control diaphragm to momentarily increase flow of liquid fuel from a supply into the diaphragm chamber and into the mixing passage for engine accelerating purposes. In the arrangement shown in my patent, differential pressure is utilized to effect movement of the second diaphragm in order to set up pressure acting against the diaphragm controlling the inlet valve to effect an increase in flow of liquid fuel into the fuel chamber for delivery into the mixing passage. In the arrangement shown in my patent, the second diaphragm establishes a fluid pressure pulse transmitted to the first diaphragm to set up an increase in fuel flow into the fuel chamber by the pressure head in the fuel supply tube, established either by gravity or a fuel pump.

Another object of the invention resides in a diaphragm-type carburetor adapted for use with engines of either two cycle or four cycle type wherein fuel flow into the mixing passage for forming a combustible mixture therein is controlled by aspiration in the mixing passage in combination with a positively operated means responsive to opening movements of the throttle for delivering liquid fuel through a duct system into the mixing passage independently of the delivery of fuel through the conventional main or primary and secondary orifices into the mixing passage.

Another object of the invention resides in the provision of an accelerating pump arrangement in combination with a diaphragm carburetor embodying an aspiration controlled fuel delivery system whereby fuel is delivered by the pump arrangement in addition to the fuel delivered through the normal orifice opening into the mixing passage for temporarily enriching the mixture for engine accelerating purposes.

Another object of the invention is the provision of mechanical means embodied in a diaphragm carburetor wherein fuel is positively delivered upon opening movement of the throttle valve into the mixing passage at a region in advance of the Venturi construction in the mixing passage.

Another object of the invention resides in a diaphragm-type carburetor wherein a diaphragm is normally influenced by aspiration in the mixing passage to control an inlet valve regulating fuel flow into the diaphragm fuel chamber in combination with an accelerating pump chamber adapted to be replenished with fuel upon closing movements of the throttle under the influence of reduced pressure effective on the diaphragm to open the inlet valve.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of the combined diaphragm carburetor and accelerating arrangement for carrying out the method of the invention;

FIGURE 2 is a top plan view of the arrangement shown in FIGURE 1;

FIGURE 3 is an end view of the construction, the view being taken at the mounting flange end of the carburetor;

FIGURE 4 is a longitudinal vertical sectional view taken on the line 4—4 of FIGURE 2;

FIGURE 5 is a transverse sectional view taken substantially on the line 5—5 of FIGURE 2;

FIGURE 6 is a view of the air inlet end of the combined diaphragm carburetor and accelerating pump construction;

FIGURE 7 is an elevational view of the opposite side of the carburetor from that shown in FIGURE 1;

FIGURE 8 is a bottom plan view of the combined diaphragm carburetor and accelerating pump construction;

FIGURE 9 is a sectional view taken substantially on the line 9—9 of FIGURE 1;

FIGURE 10 is a fragmentary detail sectional view taken on the line 10—10 of FIGURE 6;

FIGURE 11 is a fragmentary detail sectional view taken substantially on the line 11—11 of FIGURE 6;

FIGURE 12 is a transverse sectional view taken substantially on the line 12—12 of FIGURE 8;

FIGURE 13 is a detail sectional view taken substantially on the line 13—13 of FIGURE 8;

FIGURE 14 is a detail sectional view taken substantially on the line 14—14 of FIGURE 2;

FIGURE 15 is a sectional view taken substantially on the line 15—15 of FIGURE 8;

FIGURE 16 is a sectional view similar to FIGURE 15 illustrating a modified arrangement;

FIGURE 17 is a fragmentary detail sectional view illustrating a modified form of vent means for the accelerating arrangement;

FIGURE 18 illustrates a modified form of means for delivering fuel into a mixing passage for engine accelerating purposes;

FIGURE 19 is a fragmentary sectional view illustrating a modified form of valve for the accelerating well, and FIGURE 20 is a view, similar to FIGURE 19, showing another form of valve arrangement.

Referring to the drawings in detail and initially to the arrangement illustrated in FIGURES 1 through 15, the charge forming apparatus or carburetor of the diaphragm type embodying a construction for performing the enrichment for engine acceleration includes a carburetor body or body member 10, which may be of die cast metal or resinous material, formed with a mixing passage 12 in which liquid fuel and air are mixed to provide a combustible mixture for delivery to an internal combustion engine of either two cycle or four cycle type.

As particularly shown in FIGURE 4, the mixing passage 12 is formed with an air inlet 14, a main or large Venturi 16, a small or supplemental Venturi 18 contained within or adjacent the main Venturi 16 with its axis offset from that of the main Venturi, the mixing passage being formed with an outlet region 20. An air filter (not shown) of conventional construction may be disposed at the entrance of the air inlet region 14.

The outlet end of the mixing passage is fashioned with a mounting flange 22 provided with openings 23 to receive bolts (not shown) for securing the carburetor in registration with an intake manifold of a four cycle engine where the carburetor is used with this type of engine, or the mounting flange secured to the crankcase of a two cycle engine, the mixing passage outlet adapted to register with a valved port in the crankcase wall.

Positioned in the air inlet region 14 of the mixing passage is a disk-type choke valve 24 mounted upon a shaft 26 journaled for rotation in bores formed in boss portions integrally provided on the carburetor body. Secured to a portion of the shaft 26 exteriorly of the carburetor body is a manipulating arm 27 for actuating the choke valve 24. The mixture outlet 20 of the mixing passage is provided with a disk-type throttle valve 28 mounted upon a shaft 30 which is journaled in bores formed in the wall region of the carburetor defining the mixing passage.

A projecting portion of the shaft 30 at one side of the carburetor body is provided with an arm 32 on which is journaled a fitting 34 adapted to be connected with a control wire (not shown) or other means for manipulating the throttle valve 28. The carburetor body is provided with a boss portion 36 which is bored and threaded to accommodate an adjusting screw 38 providing an abutment or stop means engageable with the arm 32, as shown in FIGURE 1, for adjusting the engine idling position of the throttle valve 28.

As particularly shown in FIGURES 4, 5, 11 and 12, the carburetor body 10 is formed with a generally circular recess providing a relatively shallow fuel chamber 42 defined by a generally circular boss portion 44 formed on the carburetor body. A flexible diaphragm or membrane 46, formed of impervious material resistant to deterioration by hydrocarbon fuels, extends across the shallow fuel chamber 42 and forms a flexible wall of the chamber, the flexible wall providing variable volume for the chamber.

Disposed between the circular boss 44 and the periphery of the diaphragm 46 is a sealing gasket 48 to provide a fluid tight seal between the periphery of the diaphragm and the carburetor body. A member 50 having a generally circular cover portion engages and retains the diaphragm 46 in assembled relation with the carburetor body 10, the cover 50 being held in place by means of screws 52 extending through aligned openings in the cover 50, the diaphragm 46 and the sealing gasket 48 and are threaded into threaded bores formed in the boss portion 44 of the carburetor body.

The member 50 is fashioned with a central recess or cavity 54 to accommodate flexing movements of the diaphragm 46.

The fuel chamber 42 is unvented to the atmosphere and the diaphragm 46 is actuated or flexed by aspiration or reduced pressure set up by the velocity of the engine-induced air stream through the mixing passage. The small Venturi 18 is disposed close to the diaphragm 46 to reduce the lift to deliver fuel into the mixing passage by aspiration. The diaphragm 46 is adapted to control, regulate or meter the flow of liquid fuel from a supply into the fuel chamber 42 in accordance with the normal rate of delivery of fuel into the mixing passage 12 through orifice means hereinafter described.

As particularly shown in FIGURE 5, the carburetor body 10 is provided with a threaded bore accommodating a tubular fitting 60. Slidably disposed in the hollow interior of the fitting is an inlet valve body 62 of polygonal cross-section, as shown in FIGURE 9, to facilitate flow of liquid fuel through the interior of the fitting into the variable volume chamber 42, the fitting providing a guide or cage for the valve body 62. The valve body 62 is provided at its upper end with a cone-shaped valve portion 64 which is arranged for cooperation with a port 66 provided by an annular valve seat 68, the latter being disposed above and held in place by the valve guide or cage 60.

The port 66 is in communication with a fuel inlet passage 70. A boss 71 of the carburetor body 10 is provided with a threaded opening to accommodate the threaded portion of a fitting or coupling 72, the fitting being provided with a nipple portion 74 to accommodate a tube 76, the latter being connected with a fuel supply tank (not shown) for conveying liquid fuel to the inlet region 70 in the carburetor.

Pivotally mounted upon a fulcrum pin 78, extending into the fuel chamber 42 and secured in place by a screw 79 in the manner shown in FIGURE 13, is a lever 80 providing a motion transmitting medium between the metering diaphragm 46 and the fuel inlet valve member 62 for controlling the position of the fuel inlet valve. The long arm 82 of the lever is adapted to be engaged by a headed member 84 mounted at the central region of the diaphragm 46, there being reinforcing disks 86 and 88 at opposite sides of the diaphragm for reinforcing the diaphragm. The headed member 84 is secured in assembly with the diaphragm by swaging 90 adjacent the reinforcing disk 88. The short arm 92 of the lever 80 is arranged for engagement with the lower end of the valve member 62.

Resilient means is employed for biasing the inlet needle valve portion 64 toward the valve seat 68. In the embodiment illustrated, an expansive coil spring 94 is nested in a recess 96 formed in the carburetor body, the spring engaging the long arm of the lever to bias the inlet valve 64 toward closed position.

From FIGURE 5 it will be seen that upward movement of the diaphragm 46 causes counterclockwise movement of the lever 80 which moves the short arm 92 of the lever downwardly to permit or release the valve 64 to open the port 66 and admit liquid fuel into the fuel chamber 42.

The carburetor body 10 is formed with interconnecting ducts, channels or passages for conveying fuel from the fuel chamber 42 into the mixing passage 12. As shown in FIGURES 5 and 9, the carburetor body is formed interiorly with a circular recess 100 forming part of the fuel chamber adjacent the valve cage or fitting 60, and a restricted passage 102 is in communication with the recess 100, as shown in FIGURE 9. The carburetor body, as shown in FIGURE 9, is provided with a bore 104 having a threaded portion 106 accommodating the threaded portion of a valve body or valve member 108.

The valve body 108 is provided with a tenon portion 110 equipped with a needle valve portion 112 which cooperates with the passage 102 to admit fuel from the chamber 42 into the bore 104. The valve body 108 is provided with a manipulating knob 109 and a coil spring 111 is disposed between the knob 109 and a sealing ring 113 for providing friction to hold the valve body 108 in adjusted position and exert pressure on the ring 113.

As particularly shown in FIGURES 4 and 9, the carburetor body is provided with a bore or chamber 115 beneath and adjacent the supplemental or small Venturi 18, the chamber 115 being in communication with the bore 104 by a duct or passage 114, the lower end of the bore 115 being closed by a Welsh plug 117.

With particular reference to FIGURE 12, it will be seen that the portion of the carburetor body between the supplemental Venturi 18 and the chamber 115 is fashioned with a bore of lesser diameter than the bore 115 to accommodate the upper portion of a tubular member or means 116 which is pressed or snugly fitted into the bore 114 of lesser diameter.

The tubular means 116 opens into the small Venturi 18 and provides a main fuel delivery orifice 120. The tubular means 16 is provided with a depending portion 122 extending into the chamber or bore 115 and provides a passage 124 in communication with the interior of the upper portion of the tubular means 116. As the passage 124 is of lesser diameter than the portion 116, a ledge 126 is formed at their junction providing a seat for a valve means or member 128, in the embodiment illustrated, is in the form of a ball check valve.

Disposed in the tubular means 116 at the orifice end thereof is a grid 130 held in place by an inwardly extending flange 132 on the tubular means 116 to prevent dislodgement of the check ball or ball valve 128. There is sufficient clearance space between the grid 130 and the seat 126 to facilitate opening movement of the ball valve 128 to permit flow of fuel from the chamber 115 through the passage 124 and through the main or primary orifice 120 into the supplemental Venturi 18.

In the arrangement particularly shown in FIGURES 4, 9, 12 and 14, fuel for a secondary orifice system for engine idling and low speed operation may be supplied through the chamber or bore 115. The carburetor body is formed with a passage 136 in communication with the bore 115 through an angularly arranged channel 138, shown in FIGURE 12, the lower end of the channel being closed by a plug or shot 140. A counterbore 142 at the end of the channel 136 is closed by a Welsh plug 143. The channel 136 is in communication with a duct or channel 144 which is in communication with a channel 146 through a restricted passage 148, shown in FIGURE 9.

A portion of the bore 144 is threaded to accommodate the threaded portion of a valve body 150 which is provided with a tenon 152 terminating in a needle valve portion 154 which cooperates with the restricted passage 148 to meter or regulate fuel flow through the secondary orifice system. The valve body 150 is provided with a manipulating knob 151 and a coil spring 153 is disposed between the knob 151 and a sealing gasket 155, the spring providing friction for holding the valve body 150 in adjusted position. The end region of the passage 146 is fashioned with a counterbore 156 which is closed by a Welsh plug 158.

In communication with and extending upwardly from the passage 146 is a passage or duct 160, shown in FIGURE 14, the upper end being closed by a plug 162. The passage 160 is in communication with a supplemental chamber 164 disposed above the mixing passage as shown in FIGURES 4 and 14, by means of a passage 166.

The outer end of the chamber or bore 164 is closed by a Welsh plug 168. The secondary fuel delivery system is inclusive of an engine idling orifice 170 and a low speed orifice 172, the orifices 170 and 172 opening into the mixing passage from the supplemental chamber 164. The engine idling orifice 170 opens into the mixture outlet region 20 adjacent to and on the engine side of the throttle valve 28 for supplying fuel to the engine for idling purposes.

An air bleed arrangement, shown in FIGURE 11, functions to admit a small amount of air to the fuel for delivery through the secondary orifices 170 and 172. With particular reference to FIGURE 11, it will be seen that the carburetor body is fashioned with a passage 176, one end opening into the air inlet region 14 of the mixing passage, the other end of the air bleed passage 176 being in communication with the fuel channel 146 through a small or restricted passage 178. Thus air from the inlet region 14 of the carburetor body is admitted into the fuel channel 146 through the restriction or metering passage 178 which restricts the amount of air admixed with the fuel for the secondary fuel delivery system.

In the arrangement hereinbefore described, fuel flow from the fuel chamber 42 to the primary or main fuel delivery orifice 120 is as follows: As shown in FIGURE 9, fuel flows from the recess 100 of the fuel chamber 42 through the restriction 102, past the needle valve 112, through passage 114, bore 115, through the passage 124 in the tube 122 past the check valve 128 for delivery into the small Venturi 18 through the primary orifice 120.

In the fuel passage arrangement illustrated and above described, the fuel for the secondary orifices 170 and 172 is also metered by the manually operable valve 112, the fuel flowing from the chamber 115 adjacent the main orifice through a portion of the angularly arranged passage 138, thence through passage 136 into the bore 144 past the needle valve 154, through restriction 148 into passage 146 thence upwardly through the passages 160 and 166 into the supplemental chamber 164 for delivery through the idling and low speed orifices 170 and 172.

As the fuel for the secondary fuel delivery system is also metered by the metering needle 112 which regulates fuel flow to the main discharge orifice 120, it is essential to successful operations to employ the ball check valve 128 in the main orifice arrangement, as shown in FIGURE 12, to prevent back bleeding of air through the main orifice into the secondary fuel delivery system when the latter is delivering fuel into the mixing passage as otherwise the back bleeding of air through the main orifice would render the mixture too lean for engine operation at idling speed.

The air bleeding metering passage 178 admits a restricted or metered amount of air for delivery with the fuel from the secondary orifices. Back bleeding of air through the main orifice, which is prevented by the ball check valve 128 would provide too much air admitted into the fuel for the secondary fuel delivery orifices.

The arrangement hereinabove described is referred to as a dependent secondary fuel delivery system in that the fuel for the secondary orifice system is metered or controlled by the valve 112 which also meters the delivery of fuel to the main orifice 120.

By minor modification of channel 138, shown in FIGURE 12, the secondary system may receive its fuel direct from the fuel chamber 42 whereby the metering needle 154 becomes the sole metering or regulating means for the fuel delivered to the secondary orifices. To accomplish this the angularly arranged passage 138 is drilled so as to communicate only with the passage 126 so that there is no communication between the bore 115 and the passage 136. The plug or shot 140 is omitted from the entrance of the passage 138 whereby fuel for the secondary orifice system is then admitted through the angular passage 138 into the passage 136 and past the needle valve 154 and through passages 146, 160 and 166 into the secondary or supplemental chamber 164 for delivery through the secondary orifices 170 and 172.

The carburetor of the invention is inclusive of a throttle actuated or throttle controlled means of delivering additional fuel into the mixing passage to temporarily enrichen the fuel and air mixture for engine accelerating purposes.

In such arrangement additional fuel is delivered into the mixing passage upon opening movements of the throttle valve 28. The member 50, secured to the body 10, is fashioned with an extension or boss arrangement 180 which is formed with a bore 182 providing a chamber or well.

In the embodiment illustrated in FIGURE 15, the well or chamber 182 receives fuel from the diaphragm fuel chamber 42. Formed in the enlargement or boss 180 of member 50 is a fuel passage or duct 184 in communication with the lower end of the well or chamber 182. The passage or duct 184 is in communication with a passage 186 which opens into an enlarged passage or valve chamber 188. The metering diaphragm 46, at a region spaced laterally from the chamber 42, is provided with a flap valve 190 fashioned integrally with the diaphragm and adapted for hinging or flexing movement about the region 192 being its integral hinge connection with the diaphragm.

The carburetor body 10, at a region adjacent the flap valve 190, is fashioned with a port 194 which is in communication with the diaphragm fuel chamber 42 through a connecting channel or passage 196. As particularly shown in FIGURE 15, the flap valve is adapted to close the port 194 upon the establishment of pressure on the fuel in the passage 186 and to be opened upon a decrease in pressure in the passage 186 on the lower side of the flap valve 190.

The well or chamber 182 is provided with means for varying the volume of the chamber in order to admit fuel into the chamber when its volume is enlarged, and for delivering fuel from the chamber upon reduction in volume of the chamber. In the form shown in FIGURE 15, the chamber 182 is equipped with a plunger or piston 200 which is slidable in the well or chamber 182. The plunger or piston 200 is preferably of inverted cup shape and fashioned of flexible material such as synthetic rubber which is resistant to deterioration from hydrocarbon fuels.

Disposed within the cup-like configuration of the piston 200 is a cylindrically shaped member 202, the exterior periphery of member 202 being contiguous with the inner wall surface of the cup-shaped piston 200. The member 202 is formed with an annular recess which accommodates an annular coil spring 206, the spring being arranged to exert an outwardly directed biasing force against the piston skirt 208 to promote sealing engagement between the outer surface of the piston and the cylindrical wall surface 183 of the well.

The boss portion 180 is provided with an upwardly extending cylindrically shaped portion 210, and snugly fitted within the portion 210 is a cylindrical sleeve or coupling member 212. Disposed above the well 182 is an inverted cup shaped member or closure 214 of flexible synthetic rubber or leather having a circular portion 216 telescoped over the upper portion of the sleeve 212, the member 214 serving to exclude foreign matter from the upper portion of the well 182 above the piston.

Mounted upon the upper surface of the piston 200 is a circular disk or washer 218, and disposed within the upper portion of the flexible member 214 adjacent a horizontal portion 219 is a second circular disk or washer 220. Disposed between the washers 218 and 220 is a coil spring 222. Extending through an opening in the horizontal portion 219 of the member or closure 214 is a rod or member 224 which extends through the coil spring 222 and is fashioned with a tenon 226 of reduced diameter extending through aligned openings formed in the member 202, the piston 200 and the disk 218, the tenon 226 being pressed into member 202 whereby the piston is secured to the rod 224.

Secured to a projecting end of the throttle shaft 30 is a member 228 secured to the throttle shaft by a screw 230, as shown in FIGURE 3. The member 228 is shaped with a U-shaped portion 232 provided with a slot 234 for straddling the upper portion of the rod or member 224. As shown in FIGURE 7, the bight portion 236 provides a cam surface engaging the upper surface of a disk or washer 238 disposed adjacent and in engagement with the horizontal portion 219 of the flexible boot or member 214.

Through this arrangement, the rotation of the throttle shaft 30 effects movement of the member 228 and, as the bight portion 236 thereof engages the disk 238, the piston is movable in response to opening movements of the throttle 28 through the shaft 30.

The member 228 is so positioned on the throttle shaft 30 that when the throttle 28 is in near closed or idling position as shown in FIGURE 4, the piston 200 is at its extreme uppermost position. A pin 240 extends transversely through an opening in the upper end region of the rod 234 and engages within the bight 236 of the U-shaped portion 232 of member 228 to elevate the rod 224 and piston 220 to their uppermost positions when the throttle valve 28 is moved to near closed or idling position.

The arrangement is inclusive of fluid conveying passages and valve means between the variable volume chamber or well 182 and the mixing passage for delivering additional fuel for engine accelerating purposes into the mixing passage upon opening movements of the throttle supplementing the delivery of fuel from the fuel chamber 42 through the main or primary orifice 120 into the mixing passage. Referring to FIGURE 15, a horizontal passage 246 is formed in the member 50 which opens into a bore 248 of increased diameter, the juncture of the passage 246 and bore 248 forming a ledge or valve seat 250.

The passage 246 is in communication with the vertically disposed passage or channel 186. The bore 248 is in communication with a counterbore 252, the outer end of which is closed by a threaded member or plug 254. The counterbore 252 is in communication with a passage 256 in the body 10 by means of a connecting passage 258.

The passage 256 is in communication with a restricted supplemental fuel passage 260 opening into the mixing passage at a region slightly in advance of the entrance to the small Venturi 18 and adjacent the Venturi as shown in FIGURE 4. The outlet of the restricted passage 260 provides the orifice for the delivery of supplemental fuel for engine acceleration.

Slidably disposed in the bore 248 is a valve 262 having a stem 264 equipped with an abutment 266. An expansive coil spring 268 is disposed between the closure 254 and the abutment 266 of the valve construction, the spring normally biasing the valve 262 into closed position against the valve seat 250. As shown in FIGURE 15, a small vent opening 270 is provided in a wall defining the well 182 disposed above the uppermost position of the piston 200. The purpose of the vent 270 is to equalize the pressure above the piston 200 and to bleed off any fuel which may seep past the piston 200 from the chamber 182.

The space 54 beneath the metering diaphragm 46 is preferably vented into the air inlet region 14 of the mixing passage. As shown in FIGURE 10 the space 54 is in communication with a passage 272 in the member 50 which registers with a tube 274 extending through a wall of the inlet region of the mixing passage as shown in FIGURE 10.

The operation of the carburetor is as follows: Assuming that the fuel chamber 42 is dry, the operator first closes the choke valve 24 and opens the throttle valve 28 and initiates cranking of the engine.

Cranking of the engine sets up reduced pressure in the mixing passage which is transmitted through the primary orifice 120 and the connecting passages or bores 124, 115, 114, 104, 102 and 100 to the chamber 42 causing the diaphragm 46 to be flexed upwardly, as viewed in FIGURES 4 and 5, by reason of the reduced pressure transmitted to the fuel chamber.

As the diaphragm moves upwardly, it effects a counterclockwise movement of the lever 80, as viewed in FIGURE 5, about the fulcrum pin 78 to release the valve body 62 and valve portion 64 for movement away from the inlet valve seat 68 whereby liquid fuel flows from a supply into the fuel chamber 42 through the supply tube 76. The fuel supply may be from a fuel tank disposed above the carburetor providing a gravity head or fuel pressure may be supplied by a fuel pump.

The engine, after being started and the choke valve 24 opened, is supplied with fuel mixture from the mixing passage, the velocity of the air moving through the Venturi 18 exerting suction or lift on the fuel in the chamber 42 thus effecting delivery of fuel through the main orifice 120 for admixing with the air moving through the small Venturi 18, this mixture being further mixed with air passing through the main Venturi 16 and into the engine crankcase where the engine is of the two cycle type, or into the intake manifold if the engine is of the four cycle type.

The fuel for delivery through the main orifice 120 is conveyed from the recess 100, forming part of the fuel chamber 42, through the restricted passage 102 past the needle valve 112, through passage 114, chamber 115, passage 124 and past the check ball or valve 123 through the main or primary orifice 120 into the restricted region or choke band of the small Venturi 18. When the throttle is in idling or near closed position, or when the throttle valve is open slightly for low speed engine operation, fuel is delivered through one or both secondary orifices 170, 172 depending upon the position of the throttle valve 28.

Assuming the throttle 28 is in engine idling position, as illustrated in FIGURE 4, fuel flow for delivery through the engine idling orifice 170 is as follows: The fuel for the secondary orifices flows from the circular recess 100 through the restriction 102, past the high speed fuel metering needle valve 112, through passage 114, chamber 115 and, as shown in FIGURE 12, through the upper portion of the angular passage 138, through the channel 136 past the low speed fuel metering needle valve 154, through the restriction 148 and passage 146, thence through the connecting passages 160 and 166, shown in FIGURE 14, into the supplemental chamber 164 and into the mixing passage through the engine idling orifice 170.

When the throttle valve 28, shown in FIGURE 4, is opened slightly for low speed engine operation, fuel may be delivered from one or both orifices 170 and 172.

When fuel is being delivered through the engine idling orifice 170, near atmospheric pressure prevails in the region of the supplemental Venturi 18 and the main Venturi 16. As high engine suction is effective on the engine idling orifice 170 with the throttle valve 28 in near closed position, air tends to flow from the Venturi 18 through the main orifice 120. This is prevented by the ball check valve 128 closing the passage 124, the ball seating upon the ledge 126 shown in FIGURE 12.

Thus, the valve means 128 prevents back bleeding of air through the main orifice into the secondary fuel delivery system which air would otherwise dilute the fuel flowing through the secondary system to an extent causing the engine to stall. A small amount of air may be admitted to the fuel in the secondary system through an air bleed restriction 178 shown in FIGURE 11. The use of the air bleed makes the idle adjustment less sensitive. However, the amount of air admitted through this restriction does not reduce the amount of fuel being delivered to the idling orifice 170 to an extent sufficient to adversely affect idling of the engine. The air bleed restriction may be omitted if desired.

The arrangement for delivering additional fuel into the mixing passage for engine accelerating purposes functions as follows: Assuming that the engine has been operating at normal speed and the operator moves the throttle 28 to near closed or engine idling position, through the connection of member 228, carried by the throttle shaft 30, with the pin 240 carried by the piston rod or shaft 224, vertical movement of the piston 200 is effected upwardly in the chamber 182, as viewed in FIGURE 15, approximately to the position shown in FIGURE 15.

This upward movement of the piston 200 enlarges the volume of the well or chamber 182 reducing the pressure therein, causing fuel flow from the chamber 42 through passage 196, the valve port 194, past the flap valve 190, through interconnecting passages 186 and 184 into the well or chamber 182 to replenish a fuel supply in the well.

Upon opening movement of the throttle 28, the member 228, particularly shown in FIGURE 7, is rotated with the throttle shaft 30 in a counterclockwise direction, as viewed in FIGURE 7. The cam or bight 236 of the U-shaped portion 232 bears against the disk or washer 238, shown in FIGURE 15, and exerts downward pressure upon the horizontal portion 219 of the flexible boot or member 214, exerting pressure upon the spring 222 which is transmitted to the piston 200, forcing the piston downwardly in the well or chamber 182 thus exerting pressure on the liquid fuel in the chamber 182.

The pressure transmitted to the fuel causes fuel flow from chamber 182 through the interconnecting passages 184 and 186, through passage 246, past the spring biased needle valve 262, through the passages 258, 256 and the discharge passage 260, shown in FIGURE 4, into the mixing passage at a region slightly in advance of the small or supplemental Venturi 18. As the fuel in the chamber 182 is under pressure of the spring 222, compressed by opening movement of the throttle valve 28, the flap valve 190 is closed by fuel pressure in the passage 186, shown in FIGURE 15, to prevent reverse flow of liquid fuel into the fuel chamber 42.

The delivery of additional fuel through the bypass or supplemental fuel delivery passage 260 into the mixing passage enriches the fuel mixture in the mixing passage to thereby effect rapid acceleration of the engine. When the throttle 28 is again moved toward closed position, the piston 200 is elevated through engagement of the member 228 with the pin 240 to set up reduced pressure in the variable volume fuel chamber 182 causing fuel flow from the fuel chamber 42 past the flap valve 190 into the well or chamber 182, during which period the spring 268 maintains the valve 262 in closed position. Whenever the throttle 28 is moved toward closed position, fuel flow ensues from the diaphragm fuel chamber 42 into the accelerating well or chamber 182 to replenish the chamber with fuel.

The reduction in pressure in the well 182, due to the upward movement of the piston 200, sets up additional reduced pressure in the chamber 42 which elevates the metering diaphragm 46, shown in FIGURE 5, to further open the fuel inlet valve 64 through the medium of the lever 80, to admit additional fuel into the chamber 42 for the replenishment of fuel in the chamber 182. Through this arrangement, fuel for accelerating purposes is delivered into the fuel well or chamber 182 from the chamber 42 without affecting the delivery of fuel through the engine idling orifice 170 or the low speed orifice 172.

When the throttle valve is opened rapidly, the spring 222, disposed between the throttle controlled member 232 and the piston 200, is compressed substantially exerting substantial pressure on the fuel in the chamber 182 whereby fuel is delivered through the accelerating bypass arrangement at a greater rate than when the throttle is opened slowly. Thus more fuel is delivered in a given time through the accelerating passage 260 when the throttle valve 28 is rapidly opened than when the throttle valve is opened gradually. The vent opening 270 in a wall defining the chamber 182 above the piston 200 enables the disposal through the vent of any slight seepage of liquid fuel past the piston 200 so as to avoid accumulation of fuel in the space above the piston.

FIGURE 16 illustrates an accelerating well arrangement similar to that shown in FIGURE 15, with a modified construction of outlet valve for the acceleration bypass system. The fuel chamber 182', the piston 200', the spring 222' and the flexible closure or boot 214' are of the same construction as hereinbefore described. The piston 200' is actuated by the throttle controlled element 232' for effecting movement of the piston to cause fuel to flow into and out of the well or chamber 182'.

Upon upward movement of the piston 200' and establishment of reduced pressure in the variable volume chamber 182', fuel flows from the diaphragm chamber 42' through pasage 196' through the port 194', past the flap valve 190' which opens into the clearance space 183', and through the connecting passages 186' and 184' into the well or chamber 182'.

This action occurs whenever the throttle valve 28 is moved toward near closed or engine idling position. In the arrangement illustrated in FIGURE 16, the diaphragm 46' is fashioned with an integral flap valve 274 of the same character as the flap valve 190' but opens in the opposite direction into the clearance space 255', as illustrated in FIGURE 16.

Upon opening movement of the throttle valve 28, shown in FIGURE 4, the spring 222' is compressed by movement of the member 232' to exert biasing pressure or force on the piston 200' moving the piston downwardly to force fuel from the chamber 182' through the interconnecting passages 184' and 186', through the channels or bores 246' and 248', through the port or passage 258', past the valve 274 and through the channel 256' and into the mixing passage through the restricted passage 260, shown in FIGURE 4.

Pressure on the fuel in chamber 182' exerted by the spring 222' against the piston 200' closes the flap valve 190' to prevent reverse flow of liquid fuel into the diaphragm fuel chamber 42'. The wall defining the chamber 182' may be provided with a vent 270' to provide for the disposal of any fuel which may seep between the piston and the wall of the well into the region above the piston.

FIGURE 17 is a fragmentary view of the general arrangement of the construction shown in FIGURE 15 but with a different form of venting means for the region above the piston of the accelerating well arrangement.

In this form, the boss or enlargement 80a of member 50a is fashioned with a chamber or well 182a. Slidably disposed in the well is a piston 200a of the same construction as shown in FIGURES 15 and 16 in which is disposed a cylindrical member 202a, secured to a tenon portion 226a of a shaft 224a.

A coil spring 222a surrounds the shaft 224a and exerts a biasing force downwardly on the piston 200a when the throttle valve 28, shown in FIGURE 4, is moved toward open position. A coupling sleeve 212a is pressed or snugly fitted into a counterbore formed at the upper region of the well 182a and a flexible member, dust guard or boot 214a has a portion 216a telescoped over the coupling member 212a. The passage arrangement from the fuel chamber 42a to the accelerating well or chamber 182a, and the passage arrangement for conveying fuel for engine accelerating purposes from the well or chamber 182a into the mixing passage may be of the type shown in FIGURES 15 or 16.

Fashioned in the member 50a is a passage 278 in communication with the space or chamber 54a at the opposite side of the diaphragm 46a, being the dry side of the diaphragm. One end of a channel or passage 280 opens into the space above the piston 200a, the other end being closed by a shot or plug 282. The passage 278 is in communication with the channel 280. In the arrangement of the character illustrated in FIGURE 17, the chamber or space 54a beneath the diaphragm 46a is vented into the inlet end 14 of the mixing passage through the passage arrangement illustrated in FIGURE 10. Thus, with reference to FIGURES 10 and 17, it will be apparent that a venting means is established for the region above the piston 200a through the interconnecting passages 280, 278, chamber 54a, the passage 272 and tube 274, the latter opening into the inlet region 14 (see FIGURE 10).

This arrangement provides an internal venting means whereby the seepage of fuel past the piston 200a to the region above the piston will be conveyed away from such region through this internal venting system. If desired, a slit 284 of comparatively short length may be made in the wall of the boot or closure 214a, to admit a small amount of air into the space above the piston when subatmospheric pressure exists therein to promote air flow through the internal venting system above described.

FIGURE 18 illustrates an arrangement similar to that shown in FIGURE 16 embodying a modified form of variable volume accelerating chamber or well. In this form, the enlargement or boss 180b of member 50b is fashioned with a well or chamber 290 of cylindrical shape which is preferably vertically disposed in the member 50b but may be of different shape or orientation if desired.

The upper portion of the embossment 180b is provided with a circular extension 292. Disposed above the upper end of the well 290 is a flexible accordion-shaped member 294 fashioned of synthetic rubber, flexible plastic or other flexible material which is resistant to deterioration by hydrocarbon fuels.

The flexible member 294 is provided with a skirt portion 296 telescoped over the extension 292 which is held in fluid tight engagement with the extension by means of a securing ring 298. The member 294 is fashioned with a horizontal portion 300. Disposed on opposite faces of the portion 300 are metal disks or washers 302 and 304. Extending through openings in the washers and an opening in the portion 300 of member 294 is a tenon 306 formed on the end of a shaft or rod 308.

Slidably mounted on the shaft 308 is a washer 238b and disposed between the washer 238b and the washer 304 is a coil spring 310 similar to the coil spring 222 shown in FIGURE 15. The washer 238b is adapted to be engaged by the cam or bight portion 236 of throttle controlled member 228, shown in FIGURE 7, for extending and retracting the member 294. The shaft 308 is provided with a transversely extending pin 240b adjacent the portion 236 whereby the rod 308 and the flexible member 294 are extended upon upward movement of the throttled controlled member 232.

In assembling components of this construction, the spring 310, disks 302 and 304, and the horizontal portion 300 of member 294 are arranged on the tenon 306. The end of the tenon 306 is then swaged as shown at 307 into engagement with the washer 302 to maintain these components in assembled condition. Movements of the throttle 28, through the medium of the cam portion 236 of member 228 in engagement with the washer 238b and the pin 240b cause movements of the flexible member 294 in the manner to effect variable volume of the chamber or space 290.

The path of flow of liquid fuel from the diaphragm fuel chamber 42b to the chamber 290 occurs through the passage 196b, port 194b, past the flap valve 190b and through the interconnecting passages 186b and 184b into the lower region of the well or variable volume chamber 290. Fuel flow from the chamber 42b by way of the above-mentioned passages into the well 290 takes place upon upward movement of the pin 308 and the flexible member 294 responsive to movements of the throttle valve 28 toward closed position.

Fuel flow into the mixing passage for engine accelerating purposes when the throttle valve 28 is opened occurs as follows: Fuel from the chamber 290 flows through the interconnecting passages 184b and 186b, through aligned bores or channels 246b and 248b, through the counterbore 252b, passage 258b, past the outlet flap valve 255b and passage 256b thence through the restricted passage 260, the latter being shown in FIGURE 4, into the mixing passage adjacent the small venturi 18.

The flow of liquid fuel from the accelerating well 290 through the above-mentioned passages into the inlet region of the mixing passage 12 takes place upon opening movement of the throttle which effects downward movement of member 238b, the portion 236 of member 232 operated by the throttle compressing the spring 310.

The compressive pressure of the spring 310 acts on the flexible member 294 to flex the member to reduce the volume of the chamber 290 exerting pressure on the fuel in the chamber 290 to force the fuel through the outlet or orifice of the supplemental fuel passage 260, shown in FIGURE 4, to enrich the mixture in the mixing passage. The pressure on the fuel in the chamber 290 and passages 184b and 186b is transmitted to the flap valve 190b to close the port 194b and prevent return flow of liquid fuel into the chamber 42b.

It should be noted that in this form of arrangement for providing additional fuel for engine accelerating purposes, it is unnecessary to vent the variable volume chamber 290 as the flexible member 294 is expanded or contracted to provide for variable volume for the well 290 as the fuel is contained in the well region 290 by reason of the particular construction of the distortable member 294. A construction of this character is especially desirable where the carburetor is used with engines adapted for operation under submerged or partially submerged conditions or under conditions where it is desirable to prevent foreign matter from entering the fuel well 290.

FIGURE 19 illustrates an accelerating well arrangement similar to that shown in FIGURE 15 embodying a modified form of inlet valve between the fuel chamber 42c and the accelerating well. The fuel chamber or well 182c, the piston 200c, the spring 222c and the flexible closure or boot 214c are of the same construction as hereinbefore described. The piston 200c is actuated by the throttle controlled means acting on the spring 222c as hereinbefore described for effecting movement of the piston to cause fuel to flow into and out of the well or chamber 182c.

Formed in the member 50c is a vertically arranged passage 320 connected with the well 182c by a passage 322. A passage 246c is in communication with passage 320 for conveying fuel from the accelerating well 182c through the accelerating passage arrangement hereinbefore described into the mixing passage of the carburetor. The passage 320 is in communication with a bore or passage 324 which is in communication with the fuel chamber 42c through connecting passages 326, 327 and 328.

Disposed in the bore 324 is a ball valve 330 normally biased toward a ledge or valve seat 332 by an expansive coil spring 334 disposed in the bore 324. A retaining member 336 is pressed into a counterbore at the upper end of the passage 320 to maintain the spring 334 under slight compression. The retaining member 336 is fashioned with a central passage or opening 340 to facilitate fuel flow.

Upon upward movement of the piston 200c, occurring during a closing movement of the throttle valve 28, shown in FIGURE 4, reduced pressure or vacuum is established in the well or chamber 182c, causing the fuel in chamber 42c to flow through the passageways 328, 327 and 326, past the ball check valve 332, through the bore 324 and connecting passages 320 and 322 into the fuel chamber 182c, a valve means such as the valve 262 shown in FIGURE 15, being associated with the passage 246c.

Upon opening movement of the throttle valve 28, the spring 222c is compressed, exerting pressure or force on the piston 200c to force fuel from the chamber or well 182c through the passages 322, 320 and 246c and into the mixing passage through the acceleration bypass arrangement hereinbefore described of the character shown in either of FIGURES 15 or 16. During downward movement of the piston 200c, fuel pressure set up in the bore 324 coupled with the pressure of the spring 334 holds the ball check valve 330 on its seat 332 to prevent return flow of liquid fuel into the fuel chamber 42c during delivery of fuel through the accelerating passage system.

FIGURE 20 illustrates another accelerating well arrangement similar to that shown in FIGURE 19 embodying a modified form of inlet valve arrangement. In this form, the piston 200d, the spring 222d and the flexible boot or closure 214d are of the same construction as hereinbefore described.

The accelerating well 350 in the member 50d is of cylindrical shape to accommodate the slidable piston 200d but the region of the member 50d beneath the well 350 is fashioned with a bore or passage 352 of a diameter substantially smaller than the diameter of the well or chamber 350.

Also formed in the member 50d beneath the bore 352 is a bore or passage 354 of lesser diameter than the bore 352, providing a ledge or valve seat 356. A ball check valve 357 is contained within the bore 352 and normally engages the valve seat 356 under the influence of gravity and the head of fuel above the valve in the well 350. The fuel chamber 42d is in communication with the bore or passage 354 through interconnecting passageways 358, 359, 360, 361 and 362. The passageways 360 and 361 are drilled into the member 50d and the outer ends of the passages closed by Welsh plugs 364.

The lower end of the well or chamber 350 is in communication with an outlet pasage 366 forming part of the fuel passage system for conveying fuel from the well into the mixing passage in the manner hereinbefore described in connection with the other forms of construction shown herein, a check valve such as the valve 262, shown in FIGURE 15, being associated with passage 366.

During upward movement of the piston 200d which occurs when the throttle valve 28 is moved toward closed position, reduced pressure is established in the well 350 as the outlet passage 366 is closed by a check valve.

The reduced pressure in the well 350 causes fuel flow from the fuel chamber 42d through the communicating passages 358, 359, 360, 361, 362 and 354 elevating the check ball 357 and into the well 350. Upon downward movement of the piston 200d, under the biasing force of the spring 222d which is compressed by the throttle controlled means herein described in connection with the other forms of the construction, pressure is established in the well 350 which holds the check ball or ball valve 357 in closed position whereby fuel is projected under the pressure of the spring-biased piston 200d through the passage 366 and the system of connecting passages, such as those shown in FIGURES 15 and 16, into the mixing passage for engine accelerating purposes. The ball check valve 357 may be formed of metal or molded resinous material and is easily dislodged from its seat upon the establishment of reduced pressure in the well 350 to admit fuel into the well but which is readily closed by gravity and fuel pressure developed by spring pressure on the piston 200d.

It is apparent that, within the scope of the invention, modifications and different arrangements may be made other than as herein disclosed, and the present disclosure is illustrative merely, the invention comprehending all variations thereof.

I claim:

1. Charge forming apparatus including, in combination, a body formed with a fuel and air mixing passage having a main Venturi and a supplemental Venturi, said body having a recess, a throttle valve in the mixing passage, a diaphragm forming with said recess an unvented fuel chamber, the axis of the supplemental Venturi being between the diaphragm and the axis of the main Venturi, orifice means opening into the supplemental Venturi for delivering liquid fuel from the fuel chamber into the supplemental Venturi under the influence of aspiration in the mixing passage, means controlled by said diaphragm for regulating fuel flow from a supply into the fuel chamber, an exterior upstanding closed cylinder projecting outwardly from the carburetor body and defining a supplemental fuel well, passage means for conveying supplemental fuel from the fuel chamber to the fuel well, flap valve means integral with said diaphragm for permitting unidirectional fuel flow from said fuel chamber to said fuel well, an orifice opening into the mixing passage at the inlet end of the supplemental Venturi, a supplemental fuel passageway to convey fuel from the well to the orifice, a relatively movable piston member associated with the well, and linkage means establishing operative connection of the relatively movable member with the throttle valve and including cam means whereby closing movements of the throttle valve establish fuel flow from the fuel chamber into the well and whereby opening movements of the throttle valve establish fuel flow from the well to said orifice for engine accelerating purposes.

2. Charge forming apparatus including, in combination, means formed with a fuel and air mixing passage including a Venturi and a shallow recess, a throttle valve in the mixing passage, a diaphragm forming with said recess an unvented first fuel chamber, primary orifice means opening into the mixing passage, means for conveying fuel from the first fuel chamber to the primary orifice means under the influence of aspiration in the mixing passage, a fuel inlet valve for the first fuel chamber, said inlet valve means transmitting movement of the diaphragm to said inlet valve for regulating fuel flow from a supply into the first fuel chamber, an exterior upstanding closed reservoir projecting outwardly from the carburetor body and defining a second fuel chamber, passage means connecting the first fuel chamber with the second fuel chamber, a second orifice opening into the mixing passage adjacent the inlet end of the Venturi for delivering fuel into the mixing passage, a supplemental fuel passageway for conveying fuel from the second chamber to the second orifice, flap valve means integral with the diaphragm arranged to prevent flow of liquid fuel from the second fuel chamber into the first fuel chamber, check valve means for said supplemental fuel passageway for closing said supplemental fuel passageway when fuel is being conveyed from the first fuel chamber to the second fuel chamber, a relatively movable member associated with said second fuel chamber, and linkage means establishing operative connection between the member and the throttle valve in the mixing passage, said linkage means including cam means whereby closing movements of the throttle valve establish fuel flow from said first chamber into the second chamber and whereby opening movements of the throttle valve establish fuel flow from said second chamber through said supplemental fuel passageway through said second orifice and into the mixing passage for engine accelerating purposes.

3. Charge forming apparatus including, in combination, means formed with a fuel and air mixing passage and a shallow recess, a throttle valve in the mixing passage, a diaphragm forming with said recess an unvented first fuel chamber, primary orifice means opening into the mixing passage, means for conveying fuel from the first fuel chamber to the primary orifice means under the influence of aspiration in the mixing passage, a lever fulcrumed in the first fuel chamber, a fuel inlet valve for the first fuel chamber, said lever transmitting movement of the diaphragm to the inlet valve for controlling the position of the fuel inlet valve for regulating fuel flow from a supply into the first fuel chamber, an exterior upstanding closed cylinder projecting outwardly from the carburetor body and defining a second fuel chamber, passage means connecting the first fuel chamber with the second fuel chamber, flap valve means formed from said diaphragm and in communication with said passage means, a supplemental fuel passage opening into the inlet region of the mixing passage for delivering fuel into the mixing passage, means for conveying fuel from the second chamber to the said supplemental fuel passage, said valve means arranged to prevent flow of liquid fuel from the second fuel chamber into the first fuel chamber, check valve means for said passage means for closing said passage means when fuel is being conveyed from the first fuel chamber to the second fuel chamber, a relatively movable piston in said closed cylinder defining a second fuel chamber, linkage means establishing operative connection of the piston with the throttle valve in the mixing passage, said linkage means including cam means whereby closing movements of the throttle valve establish fuel flow from said first chamber into the second chamber and whereby opening movements of the throttle valve establish fuel flow from said second chamber through said supplemental fuel passage into the mixing passage for engine accelerating purposes.

4. Charge forming apparatus including, in combination, means formed with a fuel and air mixing passage and a shallow recess, a throttle valve in the mixing passage, a diaphragm forming with said recess an unvented fuel chamber, main and supplemental Venturies in said mixing passage, said supplemental Venturi being disposed between the diaphragm and the axis of the main Venturi, primary orifice means opening into the supplemental Venturi, secondary orifice means opening into the mixing passage, means for conveying fuel from the fuel chamber to the primary and second orifice means under the influence of aspiration in the mixing passage, a lever fulcrumed in the fuel chamber, a fuel inlet valve for the fuel chamber, said lever transmitting movement of the diaphragm to the inlet valve for controlling the position of the fuel inlet valve for regulating fuel flow from a supply into the fuel chamber, supplemental fuel well, passage means connecting the supplemental fuel chamber with the fuel well, flap valve means integral with said diaphragm for said passage means, supplemental fuel orifice opening into the mixing passage adjacent the inlet end of the supplemental Venturi for delivering fuel into the mixing passage, supplemental fuel passage means for conveying fuel from the well to the supplemental fuel orifice, valve means for said supplemental fuel passage means for closing the supplemental fuel passage means when fuel is being conveyed from the supplemental fuel chamber to the fuel well, a piston in said fuel well, and linkage means establishing operative connection of the piston with the throttle valve in the mixing passage and including cam means whereby closing movements of the throttle valve establish fuel flow from said fuel chamber into the fuel well and whereby opening movements of the throttle valve establish fuel flow from said well to said supplemental fuel orifice for engine accelerating purposes.

References Cited by the Examiner
UNITED STATES PATENTS

| | | |
|---|---|---|
| 2,210,991 | 8/1940 | Udale. |
| 2,345,168 | 3/1944 | Wirth et al. |
| 2,771,282 | 11/1956 | Olson et al. |
| 2,796,838 | 6/1957 | Phillips. |
| 3,037,751 | 6/1962 | Phillips. |
| 3,100,236 | 8/1963 | Ott et al. |
| 3,169,154 | 2/1965 | Martin et al. |

HARRY B. THORNTON, *Primary Examiner.*

RONALD R. WEAVER, *Examiner.*